US006473807B1

(12) United States Patent
Hills et al.

(10) Patent No.: US 6,473,807 B1
(45) Date of Patent: Oct. 29, 2002

(54) SYSTEM FOR INVOCATION OF CICS PROGRAMS AS DATABASE STORED PROCEDURES

(75) Inventors: Theodore S. Hills, Lambertville; Gregory M. Saxton, Jackson, both of NJ (US)

(73) Assignee: Merrill Lynch & Co., Inc., New York, NY (US)

( * ) Notice: Subject to any disclaimer, the term of this patent is extended or adjusted under 35 U.S.C. 154(b) by 0 days.

(21) Appl. No.: 09/204,765

(22) Filed: Dec. 3, 1998

(51) Int. Cl.[7] .............................. G06F 9/46; G06F 9/00; G06F 17/30
(52) U.S. Cl. ........................ 709/330; 709/331; 707/10
(58) Field of Search ........................ 707/10, 1, 104.1, 707/9; 709/201, 101, 310, 319, 330, 321, 322, 323, 327, 328, 331

(56) References Cited

U.S. PATENT DOCUMENTS

| | | | |
|---|---|---|---|
| 4,274,139 A | * | 6/1981 | Hodgkinson et al. |
| 4,346,442 A | | 8/1982 | Musmanno |
| 4,376,978 A | | 3/1983 | Musmanno |
| 4,597,046 A | | 6/1986 | Musmanno et al. |
| 4,674,044 A | | 6/1987 | Kalmus et al. |
| 4,700,297 A | | 10/1987 | Hagel, Sr. et al. |
| 4,774,663 A | | 9/1988 | Musmanno et al. |
| 5,270,922 A | | 12/1993 | Higgins |
| 5,297,032 A | | 3/1994 | Trojan et al. |
| 5,671,363 A | | 9/1997 | Cristofich et al. |
| 5,761,494 A | * | 6/1998 | Smedley et al. ............... 707/4 |
| 5,765,144 A | | 6/1998 | Larche et al. |
| 5,781,654 A | | 7/1998 | Carney |
| 5,826,243 A | | 10/1998 | Musmanno et al. |
| 5,852,732 A | * | 12/1998 | Freund et al. .............. 709/101 |
| 5,872,971 A | * | 2/1999 | Knapman et al. ........... 709/101 |
| 5,903,638 A | * | 5/1999 | Welter, Jr. et al. .......... 379/220 |
| 5,905,661 A | * | 5/1999 | Volkonsky ................... 708/552 |
| 5,974,418 A | * | 10/1999 | Blinn et al. ................. 707/100 |
| 6,003,094 A | * | 12/1999 | Dean ......................... 709/303 |
| 6,038,587 A | * | 3/2000 | Phillips et al. .............. 709/101 |
| 6,052,685 A | * | 4/2000 | Eastwick et al. ............. 707/10 |
| 6,205,482 B1 | * | 3/2001 | Navarre et al. ............. 709/227 |

OTHER PUBLICATIONS

White "Automating Information Overload: Linking Database to the Web", ACM 1997, pp. 327–331.*
Bontempo et al "The IBM Data Warehouse Architecture", ACM 1998, pp. 38–48.*
Document 1, one page, entitled "NEON Delivers First Static SQL for Power Tool OLTP in MVS/DB2," presented by NEON Systems, Inc.; No Date.
Document 2, two–sided, entitled "ShadowDirect CICS Transaction Server," preseneted by NEON Systems, Inc.; and No Date.
Document 3, 14 pages, entitled "an Introduction to CICSTransaction Server®" presented by NEON Systems, Inc. No Date.

* cited by examiner

Primary Examiner—Safet Metjahic
Assistant Examiner—Uyen Le
(74) Attorney, Agent, or Firm—Morgan, Lewis & Bockius

(57) ABSTRACT

Novel techniques for operating a transactional processing system on which a CICS progran is stored. The CICS program includes logic for implementing business rules, and logic for accessing data. An ODBC invocation proven, stored on a client data processing system, is adapted to invoke stored procedures. The invocation program, executed by a remote computer, causes execution of the stored CICS program at the transactional processing system. The invocation program causes the CICS program to access data from a computer-readable data storage medium, and to filter the data by implementing business rules. The transactional processing system is equipped with business rules. The trnnsactional processing system is equipped with stored procedures (queries), executed in response to a query command stored in the invocation program and issued by the client data processing system. Thus, the result of the query include accessed data to which business rules have been applied. The results can be processed by stored client programs.

27 Claims, 8 Drawing Sheets

SYSTEM FOR INVOCATION OF CICS PROGRAMS AS DATABASE STORED PROCEDURES

FIELD OF THE INVENTION

The present invention relates to systems and processes that support data communication between distributed computer systems. More specifically, the present invention is directed to a system and data processing method that enables the invocation of programs in a CICS transaction processing system on a remote computer as if they were stored procedures on a database management system.

BACKGROUND OF THE INVENTION

A principal benefit of computers today is the storage of large quantities of data organized in a fashion that allows select portions of the data to be located quickly and presented either to the user or other programs. This is largely accomplished today by use of sophisticated software systems known as databases. A database provides facilities not only to store data, but also to provide enhanced searches to select entries and retrieve data items pursuant to the search protocols. In addition to direct access of the identified entries in the database, advanced features provide for data entries to be related to other entries so that relevant information is accessible in a profoundly manageable mechanism. The use of these facilities is generally referred to as querying a database.

Historically, various database system vendors developed their own languages to query database systems, and also their own application programming interfaces (APIs) by which programs communicated to these database systems. In the early 1980s, an effort by the computer industry to standardize the language by which databases are queried led to the adoption in 1986 of the Structured Query Language (SQL) by the American National Standards Institute. Somewhat later, an effort to standardize database APIs led to the issuance in 1992 of the Open DataBase Connectivity (ODBC) specification. This latter standardization effort was spearheaded by Microsoft Corporation, but quickly became widely adopted by all database system vendors.

The ODBC specification incorporates the SQL specification, by stipulating that all of the query commands to be sent to a database system through an ODBC-compliant API conform to the SQL specification. Both specifications are used almost universally for database access. Both have continued to evolve. The SQL specification was most recently revised in 1992. The ODBC specification is now at version 3.52, and was most recently revised in 1997.

As a result of the development of these two related standards, it is relatively easy for programmers to develop software to access data stored in database systems using programming techniques that are essentially independent of the vendor of the database system being accessed and, therefore, portable to other competing vendor products without substantial rewriting.

With reference to FIG. 1, a common feature of a database management system 102 is the ability to store a query in the database system itself, rather than in stored client database programs 103 or stored ODBC invocation programs 101 which access the database management system 102. Such queries are called stored procedures 106. Rather than a client data processing system 107 delivering a query to database management system 102, a stored ODBC invocation program 101 indicates to the database management system 102 the stored procedure 106 it wishes to have executed. A processing mechanism 104 at the database management system 102 executes the procedure, and delivers the result to a remote computer 100 of client data processing system 107 in the same manner as if the query were embedded in the stored client database program 103. Typical database management systems 102 also include one or more stored database management programs 110 and a database 108.

With reference to FIG. 2, transaction processing for businesses is another critically important function of modem computers. At first glance, there appear to be many similarities between the hardware configurations of FIGS. 1 and 2. For example, a typical transactional processing system 202 includes a processing mechanism 204, a database that stores transactional information 208, and one or more transactional programs 210. The foregoing environment relating to databases, as described in FIG. 1, was not, however, replicated in the field of transaction support software, and this field has developed without a common pool of standard protocols. In this context, a transaction is defined as a relatively brief interaction between a human being and a computer, where a human using an online terminal types some data and presses a key to request the computer to process that data.

Historically, transactional processing system vendors have developed their products without regard to one another. This has created an environment similar to that which originally existed with database management systems (FIG. 1), where a user or programmer had to learn the details of each vendor's transactional processing system 202 in order to use it. A programmer working with a particular transactional processing system 202 was required to custom design transactional programs 210 consistent with the vendor specific protocols for that transactional processing system 202. As a general matter, transactional programs 210 are executed by a processing mechanism 204, but software protocols may differ from vendor to vendor. If the same transactional program 210 was later to be used in conjunction with another transaction support product, the program would have to be modified to comply with the next vendor's protocols. No standardization efforts have arisen to address these dissimilarities.

As in the case of a database management system 102 (FIG. 1), a transactional processing system 202 is intended for use with a client data processing system 207 that includes a remote computer 100 and a stored ODBC invocation program 201. Transactional processing system 202 also includes one or more stored client transactional programs 203. However, note that client data processing system 207 includes a display device 105. This is intended to illustrate the point that transactional processing systems are designed with the assumption that the consumer of is a human working at an online terminal, not another computer program. Some transactional processing systems, however, also offer interfaces which present their data in a manner suitable for further processing by another computer program. It is frequently the case that transaction processing systems access database systems (such as the system of FIG. 1) in order to store and retrieve data keyed in by human users. However, although a program in a transactional processing system will usually access databases through interfaces conformant to the ODBC and SQL standards, the manner in which the data is presented to the client data processing system 207 by the transactional processing system 202 generally does not conform to any vendor-neutral standard (as already stated above). Additionally, if a transactional processing system is accessing data not stored in a database system (FIG. 1), there are no standards that apply to such access.

The most widely used transaction processing system in the world today is a product of IBM, called CICS. CICS was introduced in the late 1960s, and has grown steadily in usage around the world. IBM can claim that nearly a billion transactions per day are processed through CICS systems. CICS is a registered trademark of IBM.

A number of existing systems are now offered to help support the communication with legacy programs by applying industry standard protocols. For example, Neon Systems, Inc., based in Sugarland, Texas has offered a product line of sophisticated middleware programs designed to facilitate communication to legacy programs. These products are discussed in the product brochure titled "Shadow-Direct®" and the product description titled "An Introduction to Shadow Direct", both incorporated by reference as if restated in full.

The Neon System products fill an important need in the Industry. They, however, miss a critical capability in direct communication support to CICS programs that the present invention provides.

OBJECTS AND SUMMARY OF THE PRESENT INVENTION

It is, therefore, an object of the present invention to provide a system that facilitates the access of CICS transaction systems to provide seamless transactional functionality.

It is another object of the present invention to provide a data processing method that seamlessly applies database standard protocols to perform operations in a CICS environment in a vendor neutral fashion.

It is still another object of the present invention to facilitate access to a transactional system having a proprietary API in a vendor neutral process using industry standard database protocols.

It is still another object of the present invention to process transaction operations as stored procedures independent of the protocols for the transaction system.

It is still another object of the present invention to provide seamless access to a CICS system while concurrently avoiding the 32.5 kbytes COMMAREA storage limit. COMMAREA is a registered trademark of IBM.

The above and other objects are realized in the form of a computer system that allows a programmer to create a program in IBM's CICS system that appears to be a database stored procedure. The program can be invoked through an ODBC-compliant API, using a command conforming to the SQL standard. Likewise, the program's results can be obtained through the same ODBC-compliant API. The present invention seamlessly manages the interaction between current client-based programs and CICS programs by implementing a data communication protocol. This is accomplished by incorporating a specifically configured driver as a dynamically linked library, termed here a TGADP DRIVER that manages the communication to the transaction software. TGADP is a registered trademark of Merrill Lynch & Co., Inc. This driver operates in conjunction with the transaction API to facilitate the transfer of the request to the transactional system and support the results reported by the transactional system back to the querying client program. This process makes it possible for software designed to invoke stored procedures through ODBC to be used to invoke CICS programs, even if that software was not originally conceived to do so. Thus, not only can custom applications be written to invoke CICS programs in this manner, but many ODBC-compliant programs may also be used, including such products as Microsoft's Active Data Objects (ADO), MS Query tool, and Visual Basic for Applications (VBA).

The program so invoked can be an arbitrary CICS program, which may or may not access data in a database system. The program may access data in ordinary ("flat") files, indexed (VSAM) files, or in databases not conformant to ODBC or SQL. The program may call or communicate with other programs, calculate results, and in fact do anything that a CICS program can do. If it chooses, the program may produce its results to appear as if they were data selected from a database (a "result set," in ODBC parlance).

In accord with the varying features of the present invention, the CICS program is invoked by this invention through an interface supplied by IBM called External Call Interface (ECI). This is IBM's vendor-specific API provided to allow an application program which is not running under CICS to call an application program running under CICS. Besides being a non-standard interface, this ECI interface is limited to returning no more than 32,500 bytes of information from the CICS program. This invention overcomes that limit, through the implementation of a novel overflow mechanism. Without this innovation, application programs on both sides of the ECI interface must be programmed for the case where results may exceed 32,500 bytes, adding complexity to their implementations. Applying the inventive approach, application programs operate seamlessly without concern for the existence of this limitation.

DETAILED DESCRIPTION OF THE PREFERRED EMBODIMENT

Pursuant to one embodiment of the present invention, a system and software process are disclosed for enhancing the communication between modern programs running in a Microsoft Windows® environment, and legacy programs having proprietary interfaces that support transactions, and in particular, the CICS transaction environment. The approach is to provide a special driver, given the name here TGADP DRIVER, on the Intel processor-controlled computer that establishes the essential linking logic and memory to the proprietary transaction system using an industry standard API, known as ODBC. A second program is resident on the system supporting transaction operations.

This second program, given the name here of TGADP, facilitates the creation of the transaction results and communication of these transaction results back to the requesting program. This second component is further divided into API and implementing program so that changes in API can be accomplished while avoiding modifications to the implementing program.

A plurality of remote workstations are interconnected to a network supported by communications protocols, such as TCP/IP to allow interaction with network based resources, such as a transactional data processing system. The network may further include local workstations and further comprises several server types for processing incoming requests from any of the workstations on the network.

Figure 1:
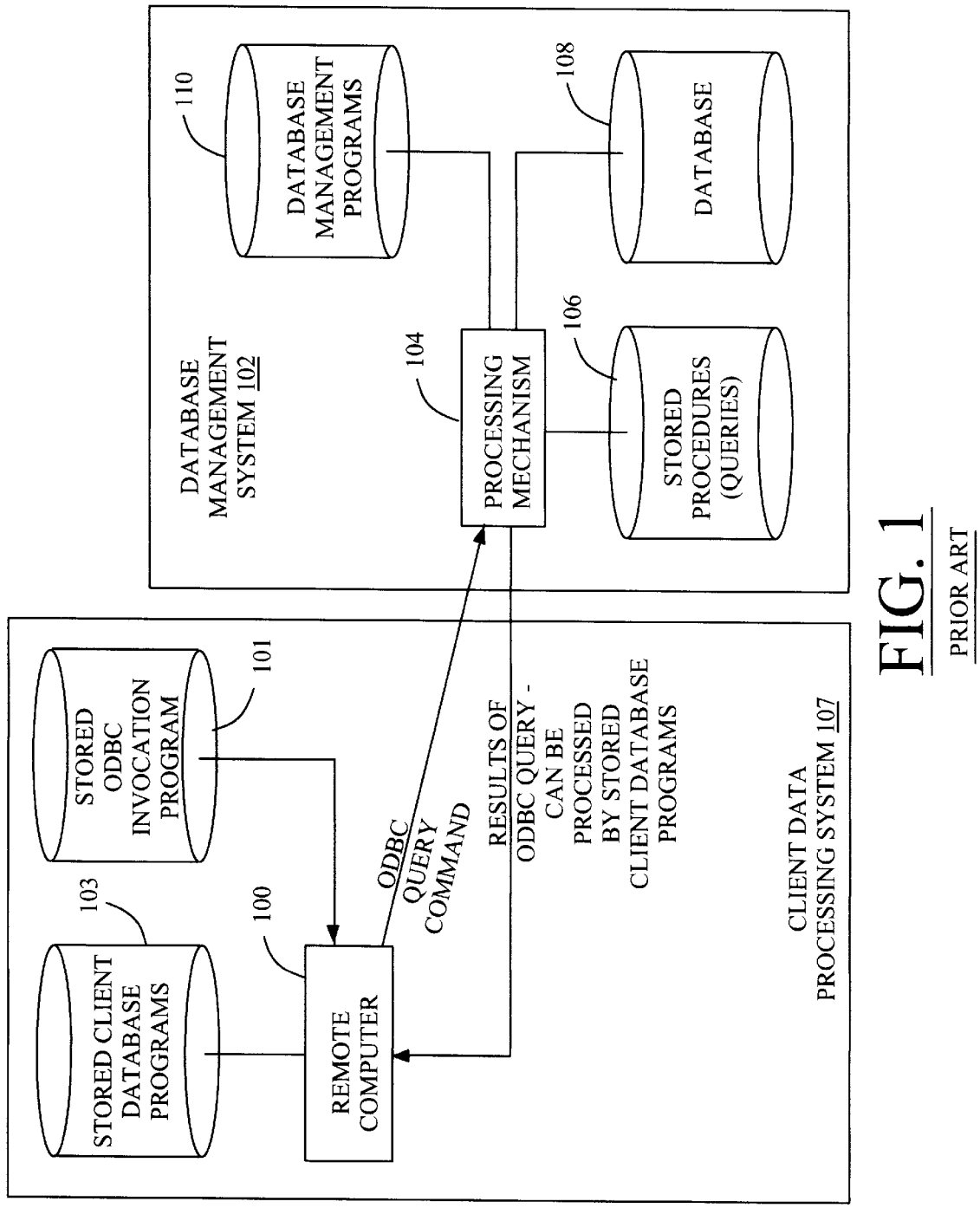
FIG. 1 is a hardware block diagram of a prior art database management system.
Figure 2:
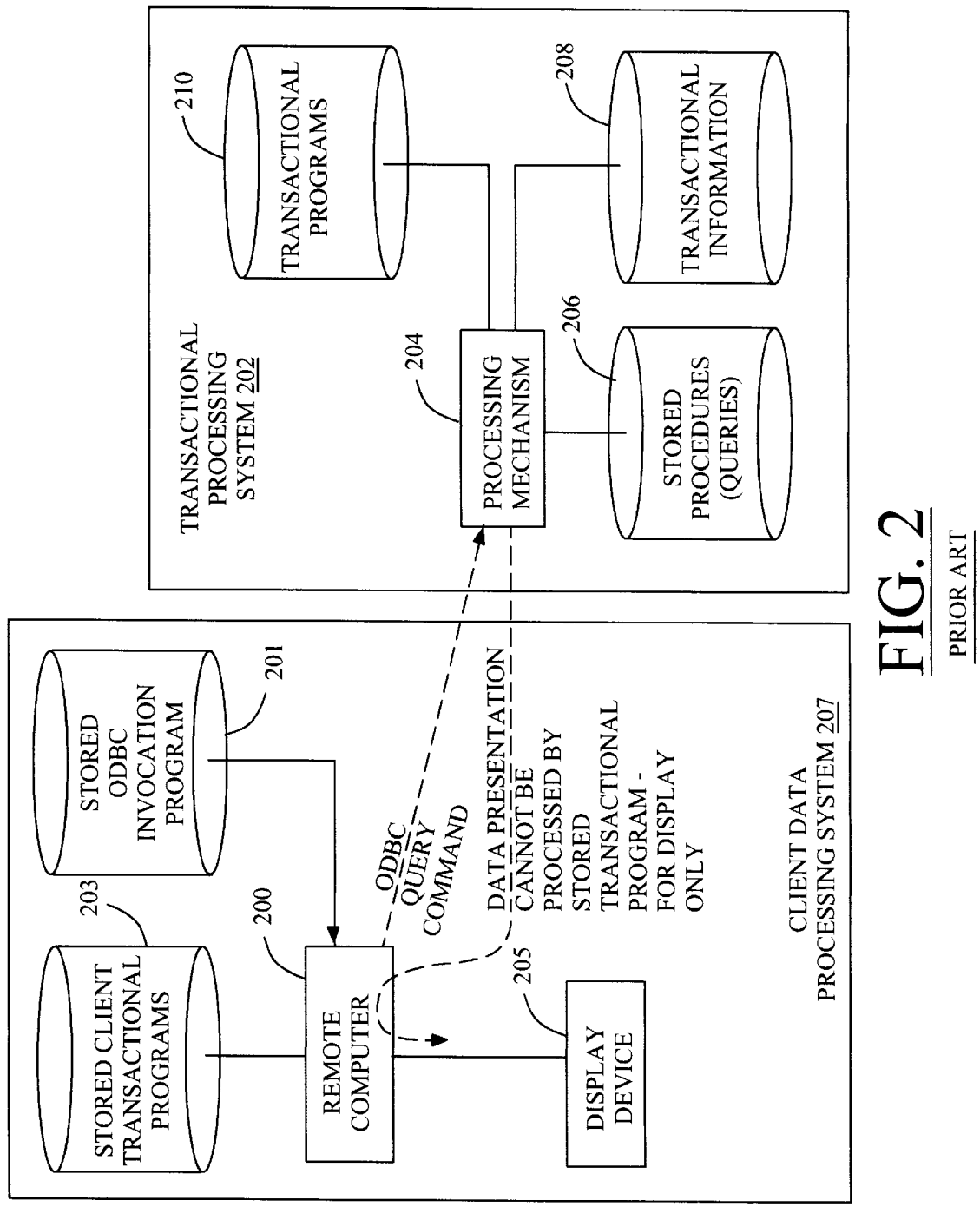
FIG. 2 is a hardware block diagram of a prior art transactional processing system.
Figure 3A:
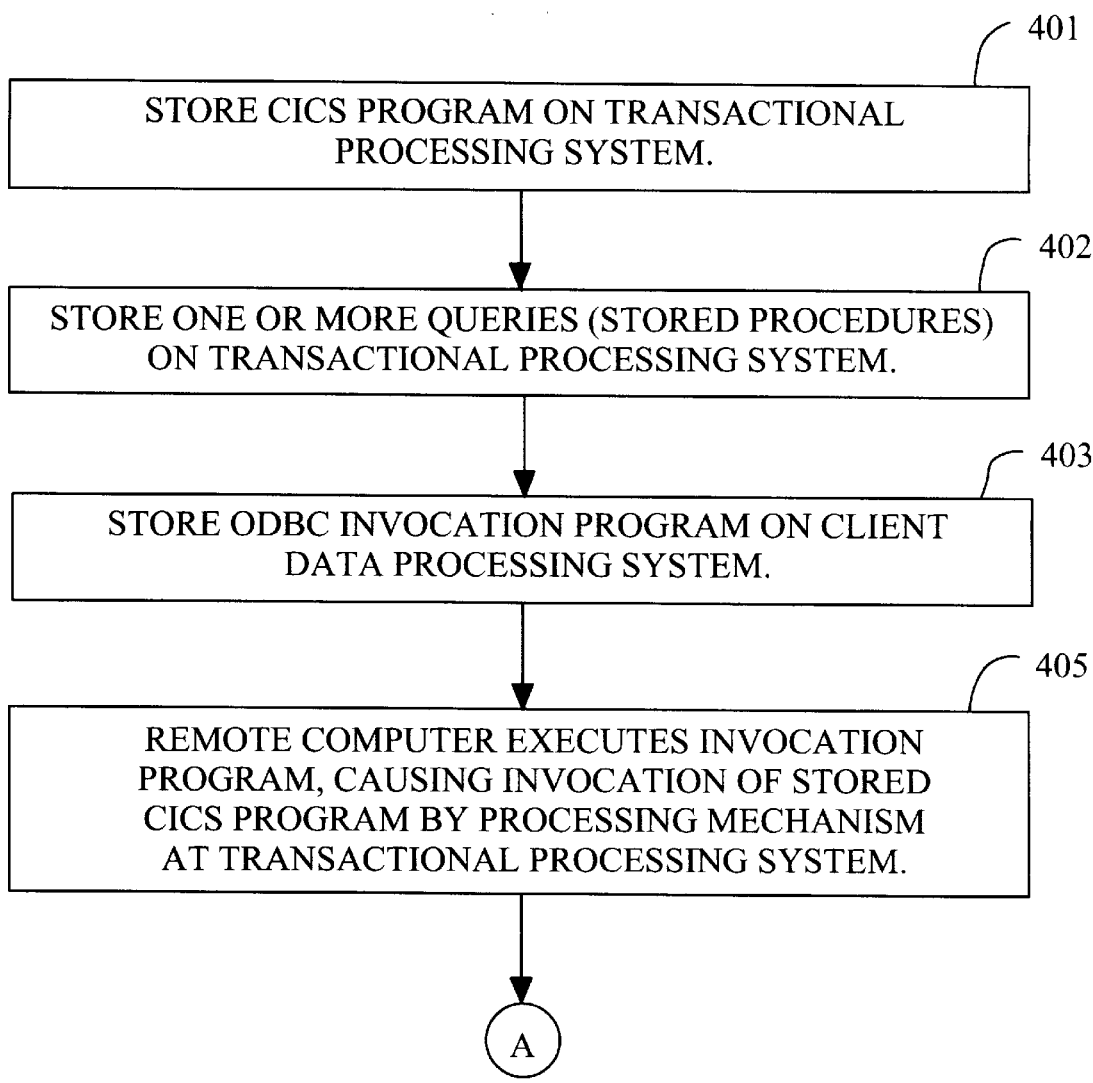
FIGS. 3A and 3B together comprise a flowchart setting forth an operational sequence which may be performed pursuant to the techniques of the present invention.
Figure 3B:
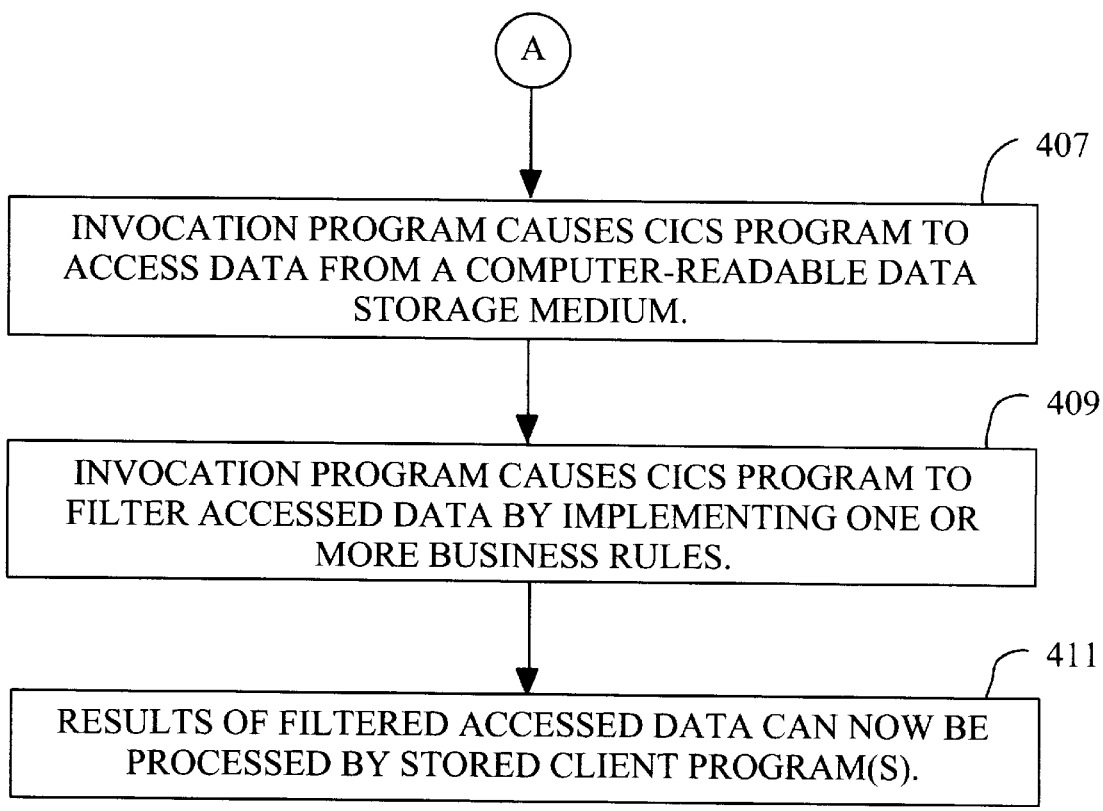

Refer now to FIGS. 3A and 3B which set forth a novel technique for operating a transactional processing system according to a preferred embodiment of the present invention. At block 401, a CICS program is stored on the transactional processing system. The CICS program includes logic for implementing one or more business rules, and data access logic for accessing data. The transactional processing system is equipped with one or more stored procedures (queries) (block 402), which may be executed in response to an ODBC query command stored in an ODBC invocation program and issued by the client data processing system. At block 403, an ODBC invocation program is stored on a client data processing system. The invocation program is adapted to invoke one or more stored procedures through ODBC (open database connectivity). At block 405, the invocation program is executed by a remote computer so as to invoke an execution of the stored CICS program by a processing mechanism at the transactional processing system. The invocation program causes the CICS program to (a) access data from a computer-readable data storage medium (block 407), and (block 409) to filter the accessed data by implementing one or more business rules. Thus, in accordance with the foregoing procedure, the results of the ODBC query include accessed data to which one or more business rules have been applied. The results can be processed by stored client programs.

The remote computer may be equipped with a web browser such as Internet Explorer or Netscape Navigator for Internet based communications to an NT server transactional processing system. Also supported would be communications based on the same protocols, but internal and isolated from the Internet, known as Intranet links via a client. These links may operate in conjunction with Windows based software with user-friendly graphical interfaces that support a number of operations that ultimately require CICS processed data, such as asset trading and reporting.

Illustratively, a client data processing system may be coupled to a supporting application on an NT server that runs this application (termed CLIENT_APP) through the specific client API on the server. In this case, CLIENT_APP would represent an ODBC invocation program. The NT server forwards client requests for data (including ODBC queries) to the transactional processing system. Once the request is parsed by the ODBC invocation program—i.e., CLIENT_APP—it is processed in sequence through an the ODBC DRIVER MANAGER software layer, a the TGADP DRIVER layer, an ECI call layer, and finally, the a CICS client layer. Utilizing the TCP/IP protocol, the request is then passed, perhaps through a SP/2 computer (e.g., IBM CICS/6000 System, but transforming the communication protocol to SNA) to the mainframe for CICS processing. This may involve retrieving and writing data to a database via DB-2.

The NT systemss referred to in the foregoing paragraph may reflect operation on a system running Microsoft's Windows NT operating system using an Intel processor. The CLIENT_APP is any computer program which invokes CICS application programs through TGADP. The ODBC DRIVER MANAGER is a standard component supplied by Microsoft in conjunction with the operating system,which may be stored as part of an ODBC invocation program for execution at a remote computer, and/or stored at a server associated with client data processing system, such as the aforementioned NT server. As a general matter, the ODBC DRIVER MANAGER is part of any system that conforms to the ODBC API. The ODBC DRIVER MANAGER's primary purpose is to select a vendor-specific driver which conforms to the ODBC API, and to pass ODBC API calls from a CLIENT_APP to the selected driver, which is in this case the TGADP DRIVER.

The TGADP DRIVER is a dynamically linked library (stored, for example, as part of an ODBC invocation program and/or at the aforementioned NT server) that conforms to the ODBC (version 2.0) driver specification. It is this software which interprets a command in SQL-specified syntax to invoke a program as a stored procedure with given parameters. It converts this command, along with given parameters, into a call to the transactional processing system using, for example, a software product available from IBM which is termed ECI (External Call Interface). The External Call Interface (ECI) calls CICS programs from non-CICS systems and allows a calling program to establish a communications area, or COMMAREA, of up to 32,500 bytes of memory. The calling program initializes the COMMAREA to whatever value it wishes, then calls ECI, indicating the name of the CICS program to invoke, and the COMMAREA to ECI.

Figure 4A:
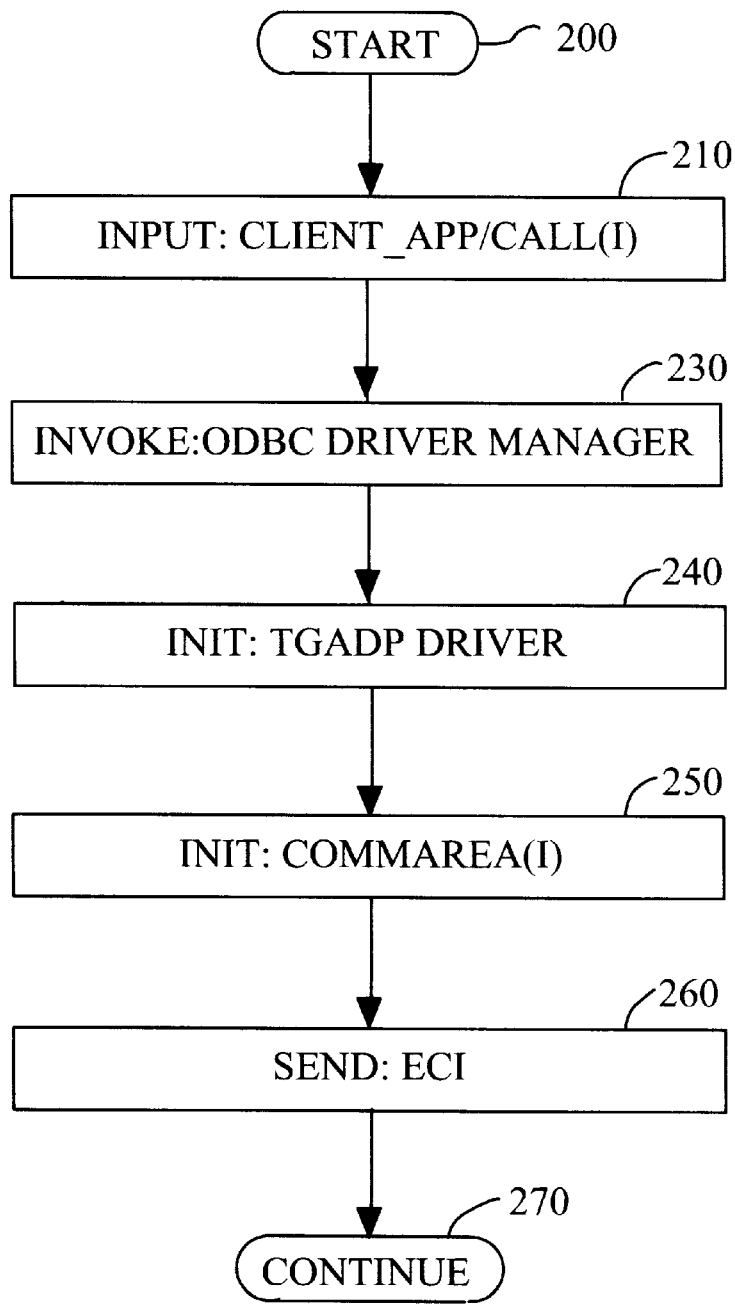
FIG. 4A is a flowchart setting forth an operational sequence for implementing a client application program in accordance with a preferred embodiment of the invention.
Figure 4B:
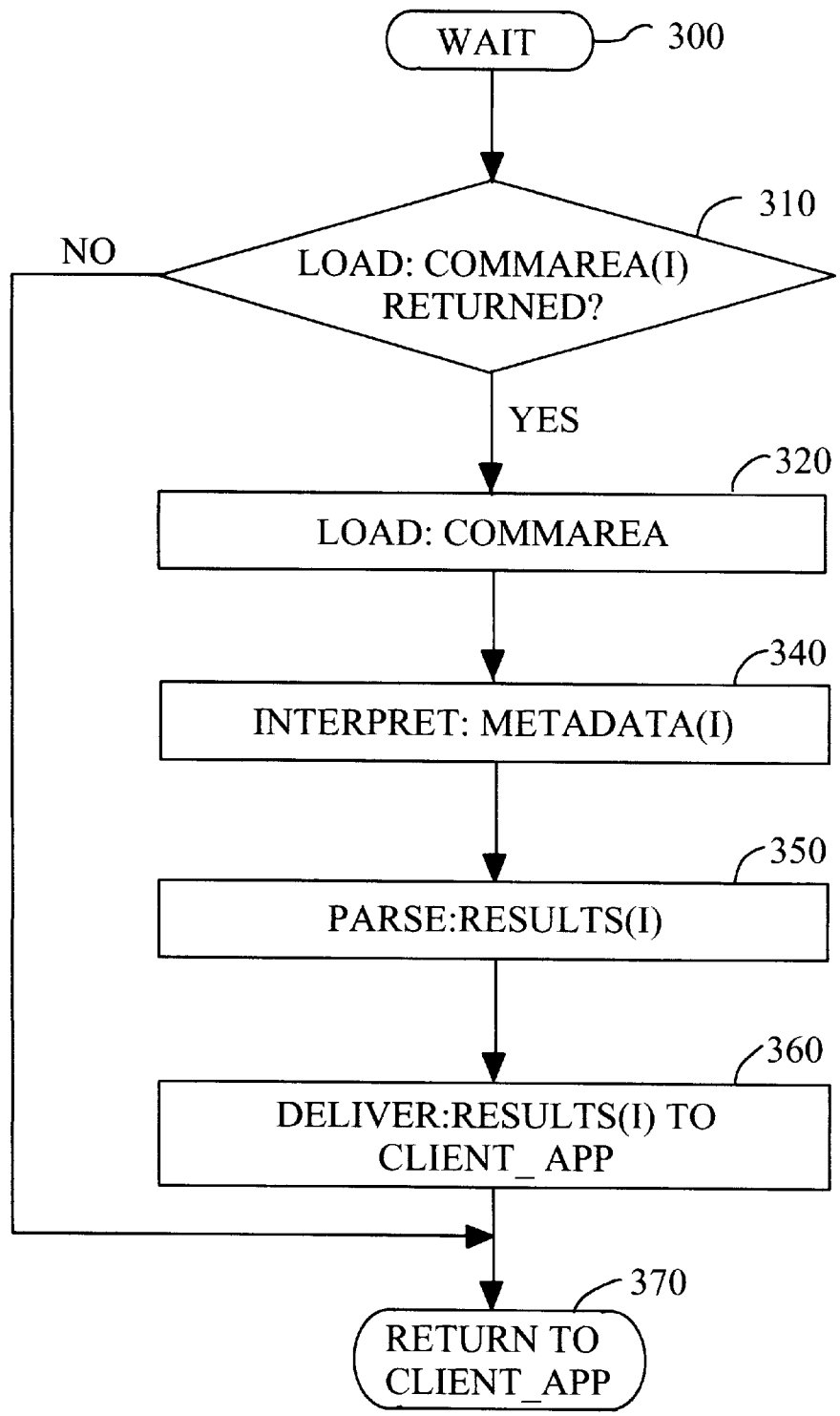
FIG. 4B is a flowchart setting forth an operational sequence for controlling the retrieval of data from a CICS program in accordance with a preferred embodiment of the invention.
Figure 5:
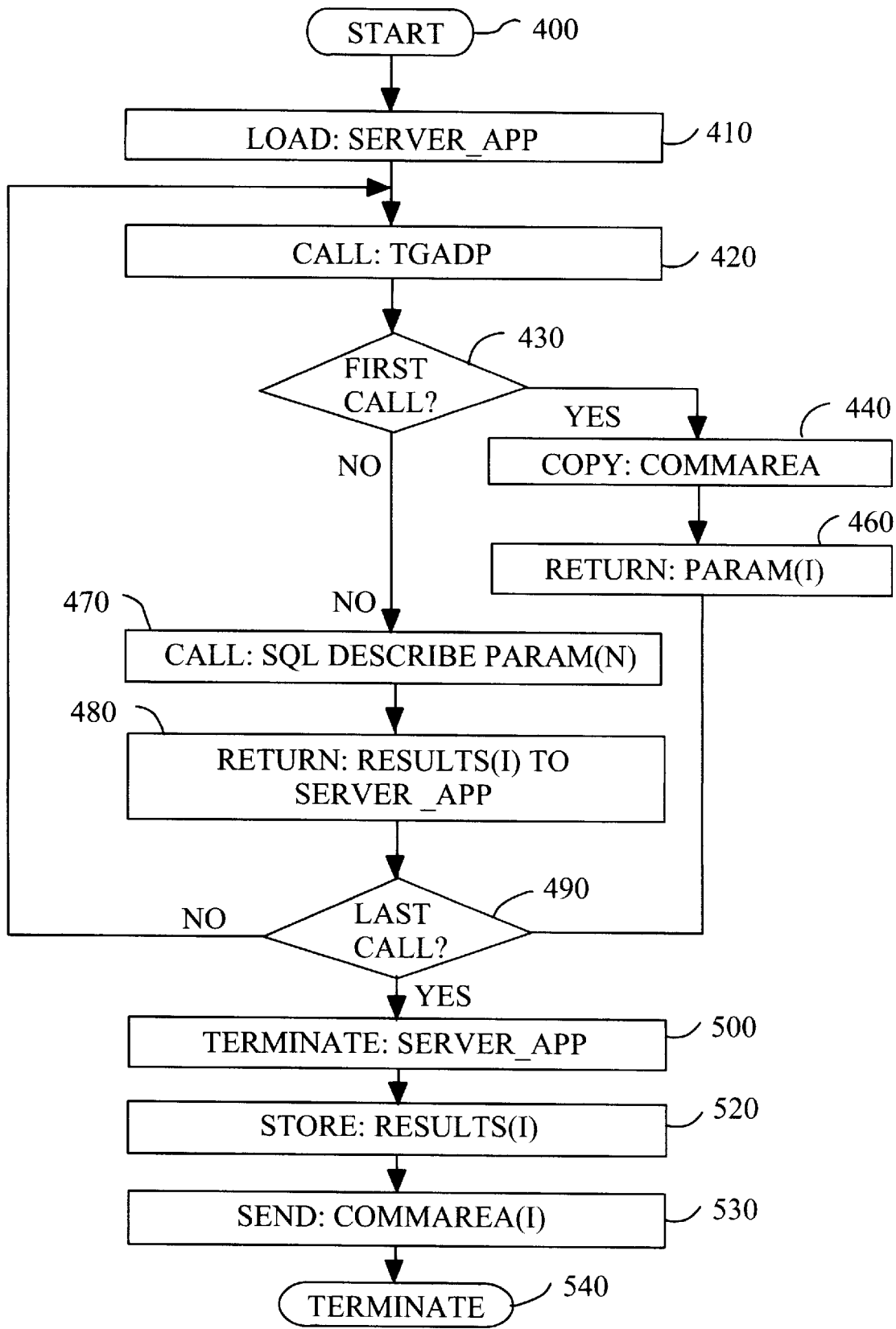
FIG. 5 is a flowchart depicting an operational sequence for implementing a TGADP driver according to a preferred embodiment of the present invention.

Operation of the foregoing process is better understood with review of the flow charts of FIGS. 4A, 4B, and 5. Turning first to FIG. 4A for the CLIENT_APP, logic begins at start 200, and input of Call(I) at block 210. The CLIENT_APP system invokes the ODBC DRIVER MANAGER, block 230, which triggers the TGADP DRIVER, block 240, which in turn interprets the CLIENT_APP Call string. More specifically, the CLIENT_APP calls the TGADP DRIVER per the ODBC specification (either via SQLPrepare or SQLExecDirect), supplying a string in the SQL syntax. This string is of the form of a stored procedure call, with parameters. (See Examples, infra).

The TGADP DRIVER allocates a COMMAREA to hold the stored procedure parameters for the program on invocation, and to hold the program's results upon return, block 250, and stores the given parameters along with MetaData (data describing the parameters) in this COMMAREA. The TGADP DRIVER requests ECI to run the program named as a stored procedure (either via SQLExecute or SQLExecDirect), block 260, and passing the COMMAREA. The process then waits for returned data (FIG. 4B).

ECI sends the request and COMMAREA to the CICS/6000 system, which forwards them to the CICS/ESA system on the mainframe. CICS/ESA allocates memory for a COMMAREA, copies the received COMMAREA into this new area, and starts the requested program.

Normally, the requested CICS program on the mainframe accesses and interprets data in the received COMMAREA, and modifies the COMMAREA to return its results. However, when using TGADP, the requested program does not access or modify the COMMAREA. This process is controlled by the logic of TGADP, as described in the discussion of FIG. 5-, infra.

After completing CICS processing, the requested CICS program terminates, and the modified COMMAREA is transmitted by CICS back to the original requester. Turning now to FIG. 4B, the logic controlling the return of CICS transaction data is depicted. This is indicated by the initial wait state, block 300. At termination of SERVER_APP (discussed infra, FIG. 5), the COMMAREA(I) flows back to the TGADP DRIVER through the normal mechanism provided by CIC S, and its return is tested at Test 310.

If a positive response is sensed, logic continues to block 320 where the COMMAREA(I) is loaded. TGADP DRIVER interprets MetaData, block 340, and parses the COMMAREA, extracting the result sets based on the MetaData, block 350. The output parameters and result sets so extracted are then delivered to the CLIENT_APP through the ODBC-compliant Calls, e.g., SQLFetch, block 360. These are then routed to the CLIENT_APP completing the requested task. The process then returns to the CLIENT_APP, block 370.

Figure 6:
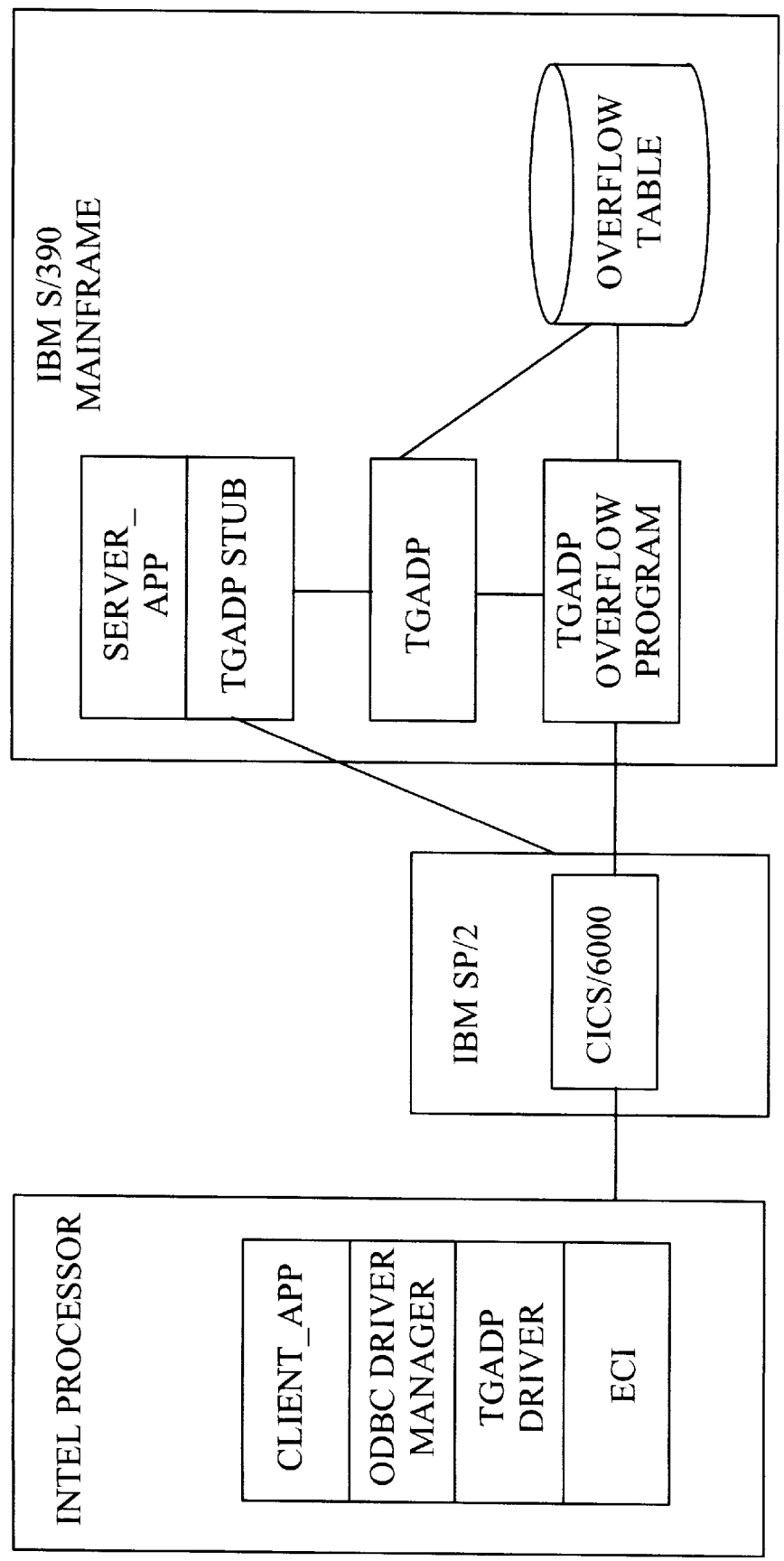
FIG. 6 is a hardware block diagram depicting an illustrative system architecture which may be utilized to perform the operational sequence of FIGS. 3A and 3B.

There are several architectures suitable for supporting the present invention, one of which is presented in FIG. 6. As depicted, the IBM ECI product connects to an IBM CICS/6000 system running on an IBM SP/2 computer, which then connects to an IBM CICS/ESA system running on an IBM S/390 MAINFRAME. This configuration is necessitated by the fact that IBM's ECI product may only communicate with a CICS system capable of communicating via the widely used TCP/IP protocol. IBM's CICS for the SP/2 computer, CICS/6000, has this capability, as does its CICS for OS/2, another IBM product. The CICS/6000 system communicates to the IBM S/390 MAINFRAME using a proprietary IBM protocol called SNA.

In the preferred embodiment, a standard configuration table in the CICS/6000 system indicates that the program requested via ECI in fact resides on the IBM S/390 MAINFRAME. Through a feature built into CICS systems called Distributed Program Link (DPL), the CICS/6000 system forwards the program request and associated COMMAREA to the CICS/ESA system on the IBM S/390 MAINFRAME. This facility is transparent to TGADP. On the return trip, the CICS/ESA system returns the modified COMMAREA to the CICS/6000 system, which returns it to the original requester.

It is possible, though not shown in the preferred embodiment, for the SERVER_APP program to reside in the CICS/6000 system. The extra hop from the CICS/6000 system to the CICS/ESA system would be eliminated. All other aspects of this invention would remain the same.

The operation of the CICS supported transaction application (hereinafter "SERVER_APP") is presented in FIG. 5. As discussed previously, normal CICS programs designed for use with the ECI interface access parameters in their COMMAREA, and store their results in the COMMAREA. TGADP SERVER_APP, however, leaves manipulation of the COMMAREA entirely to TGADP. Specifically, SERVER_APP uses the API provided by TGADP to retrieve parameters from the COMMAREA, and to place results in the COMMAREA, in accordance with the logic governing operation of TGADP.

As discussed above, there is a widely accepted standard interface for a client program to use to retrieve data from a database, namely ODBC. However, there is no corresponding standard interface for a server program to use to deliver data as if it were a database. Rather than design such an API from scratch, TGADP adapts function calls already defined in the ODBC API, by interpreting them in reverse. Only eight such function calls (shown in Table I) are needed to allow SERVER_APP to obtain its parameters and return its results. While this approach is used in the Shadow RPC product by Neon Systems, Inc., the Shadow RPC product does not allow direct communication with CICS programs.

TABLE I

| Function Calls |
|---|
| SQLNumParams |
| SQLDescribeParam |
| SQLGetInfo |
| SQLResetParam |
| SQLError |
| SQLBindCol |
| SQLThrow |
| SQLReturnStatus |

The TGADP API is implemented in a TGADP STUB statically linked library. There are two reasons for splitting the API out from TGADP and placing it in the STUB. Firstly, it is required by IBM's Common Language Environment product to allow the SERVER_APP, written in any supported programming language (such as C or COBOL) to call the TGADP API. Secondly, it isolates the API from the remainder of the implementation of TGADP, so that the API may be changed in the future, if desired, without affecting the integrity of the main program.

Referring now to FIG. 5, operation in the CICS environment conceptually begins at block 400 and loads the requested service, SERVER_APP, block 410. At block 420, the SERVER_APP calls TGADP via the API function SQLDescribeParam to obtain a description of its first parameter. At test 430, TGADP detects if this is the first parameter Call it has received; if so, TGADP copies the COMMAREA (D), containing the program's parameters, to a separate memory area, block 440, and initializes the COMMAREA (I) for the program's results. After this sequence, TGADP returns the first parameter, Param(I) to the program, block 460.

The CICS program, SERVER_APP continues to process the parameters from the COMMAREA in sequences, by repeated Calls, block 470, expressed as SQLDescribeParam Statements. As results begin to accrue, these are delivered as either "output parameters" or "result sets" consistent with the ODBC protocol, block 480. Specifically if the CLIENT_APP set any parameters as input/output or output, upon termination of the SERVER_APP, TGADP will collect the current value of these parameters and store them in the COMMAREA for return to the CLIENT_APP, along with MetaData describing the parameters.

This is depicted in FIG. 5 wherein the SERVER_APP terminates, block 500, if a positive response is received from Test 490 culling the last Call. Upon termination, the results are stored, block 520, and then passed back to the CLIENT_APP in the COMMAREA(I), block 530.

In order to deliver results through output parameters, the SERVER_APP modifies these parameters. In order to return results as result sets, which appear to be the result of selecting data from a database (and not a CICS Transaction Server), SERVER_APP must first describe each result set to TGADP using SQLDescribeCol. SERVER_APP then "throws" each row of a result set to TGADP using SQLThrow. TGADP then creates MetaData describing each column of a result set and stores this and the result set itself in the COMMAREA.

As the SERVER_APP generates results, the COMMAREA begins to fill up. When the results reach the limit of the COMMAREA, TGADP initiates an overflow operation, wherein the next sequence of data is formatted and placed in rows in a table in the DB2 DATABASE SYSTEM, called the OVERFLOW TABLE. Upon writing the first row of overflow data, TGADP saves the key to that first row in the COMMAREA. When the SERVER_APP terminates, the COMMAREA that flows back to the TGADP DRIVER contains the overflow key in a designated place.

As discussed above, the CLIENT_APP requests data from the SERVER_APP results using standard ODBC API functions, such as SQLFetch. When the CLIENT_APP asks for more data than has been received from the COMMAREA, the TGADP DRIVER checks the overflow key in the COMMAREA. If it is not a null key, the TGADP DRIVER requests via ECI to run the TGADP OVERFLOW PROGRAM, passing in its COMMAREA the overflow key.

Upon starting, the TGADP OVERFLOW PROGRAM uses the key received in the COMMAREA to begin fetching as many rows of overflow data as will fit in the COMMAREA. It increments the key to indicate the row after the last row placed into the COMMAREA. If there are no more rows of overflow data, it nullifies the key.

Upon return, the TGADP DRIVER treats the overflow data in exactly the same manner as data received in the first COMMAREA from the SERVER_APP. It delivers data from this COMMAREA as it is requested by the CLIENT_APP. Again, if the CLIENT_APP asks for more data than received, the TGADP DRIVER checks the overflow key in the COMMAREA, and if it is not a null key, requests the TGADP OVERFLOW PROGRAM again. All of this behavior, however, is invisible to the CLIENT_APP through the ODBC API.

This overflow mechanism can be used to deliver results limited in size only by the storage capacity of the OVERFLOW TABLE and the size of the overflow key. That key is currently able to address (2) to 31st Power, or over 2 billion, rows, and each row is 4000 bytes in size. Thus, the limit of 32,500 bytes in one COMMAREA becomes a limit of over 8 trillion bytes.

EXAMPLES

The SQL standard specifies the syntax for invoking a database stored procedure. It is exactly this syntax which is implemented by the TGADP DRIVER. The TGADP DRIVER simply interprets the stored procedure name as the CICS program name to be requested through the ECI interface.

For example, a string "CALL ABCDEFG();" indicates that a CICS program named ABCDEFG should be invoked, with no parameters. A string "CALL ABCDEFGH(1,'XX');" indicates that a CICS program named ABCDEFGH should be invoked, with two parameters. The first parameter is the number one, and the second parameter is the character string XX.

As specified by the ODBC specification, parameter markers may be used in the string. A parameter marker is a question mark in a position where a parameter must be supplied. The CLIENT_APP must bind each parameter marker to an actual parameter by calling the ODBC function SQLBindParameter. This allows CLIENT_APPs more flexibility in the nature of the parameters they can pass through the ODBC interface. It is also the means whereby output and input/output parameters are obtained.

For example the string "CALL HIJKLMNO(1,?,'XX');" indicates that a CICS program named HIJKLMNO should be invoked, with three parameters. The first parameter is the number one. The second parameter will be supplied in a SQLBindParameter call before the execution request is made through SQLExecute or SQLExecDirect. The third parameter is the character string XX. Unlike the first and third parameters, whose type, size, and value are derived from the literal parameter strings, the type, size, and value of the second parameter will be specified in the SQLBindParameter call.

It should be noted in FIG. 6 that the CLIENT_APP and the SERVER_APP are executing on computers with very different architectures. Specifically, binary integers in Intel processors are stored in little-endian format (the byte containing the least-significant bits is at the lowest memory address), while binary integers in S/390 processors are stored in big-endian format (the byte containing the least-significant bits is at the highest memory address). Additionally, the native character set used by the Windows NT operating system is ASCII, while the native character set used by the OS/390 operating system is EBCDIC. There is also a difference in the floating-point number representation format used by the two architectures.

The TGADP DRIVER and the TGADP component on the mainframe are aware of the two different architectures, and transparently make all necessary conversions between the two formats, for data types declared to be integer, character, or floating point.

While the invention has been particularly shown and described with reference to a preferred embodiment, it will be understood to those skilled in the art that various changes in form and detail may be made therein without departing from the spirit and scope of the invention.

What is claimed is:

1. A method for utilizing a CICS program stored on a transactional data processing system, the CICS program containing (i) logic for implementing one or more business rules, and (ii) logic for accessing data, the method including the steps of (a) storing an invocation program on a client data processing system, wherein the invocation program is adapted to invoke one or more stored procedures through ODBC (open database connectivity);

(b) executing the invocation program so as to invoke an execution of the stored CICS program by the transactional data processing system, wherein the invocation program causes the CICS program to: (i) access data, and (ii) to filter the accessed data by implementing one or more business rules;

(c) receiving a transactional request from the client data processing system;

(d) translating the request for use at the transactional data processing system by using one or more application program interfaces (APIs);

(e) executing the translated request to generate request results;

(f) executing one or more application program interfaces (APIs) to translate the request result for subsequent use at the client data processing system; and (g) transferring the translated request results to the client data processing system;
  wherein steps (d) and (f) are performed using a dynamically-linked library (DLL) to manage communication between the transactional data processing system and the client data processing system, and wherein the DLL is provided in the form of a specifically configured driver for managing communication between the transactional data processing system and the client data processing system.

2. The method of claim 1 wherein he specifically configured driver manages communication between the transactional data processing system and the client data processing system by sending a remote procedure call to the transactional data processing system, wherein the remote procedure call specifies (a) a name or identity of a remote procedure to be invoked by the transactional data processing system; and (b) one or more parameters specifying data to be accessed by the CICS program.

3. The method of claim 2 further including the step of the tansactional data processing system receiving the remote procedure call.

4. The method of claim 3 wherein, in response to the receipt of the remote procedure call, the transactional data processing system executes the CICS program, utilizing the one or more parameters to filter accessed data by applying one or more business rules to the accessed data.

5. The method of claim 4 further including the step of the CICS program accessing data specified by the one or more parameters by invoking one or more API calls.

6. The method of claim 5 further including the step of The CICS program using the one or more parameters and the accessed data to generate an outbound array comprising one or more columns and one or more rows, wherein the outbound array comprises filtered accessed data, and wherein the outbound array represents selected data from the transactional data processing system as requested by the client data processing system.

7. The method of claim 6 further including the steps of the transactional data processing system sending the outbound array to the client data processing system, and the client data processing system receiving the outbound array from the transactional data processing system.

8. A method for utilizing a CICS program stored on a transactional data processing system, the CICS program containing (i) logic for implementing one or more business rules, and (ii) logic for accessing data, the method including the steps of (a) storing an invocation program on a client data processing system, wherein the invocation program is adapted to invoke one or more stored procedures through ODBC (open database connectivity);

(b) executing the invocation program so as to invoke an execution of the stored CICS program by the transactional data processing system, wherein the invocation program causes the CICS program to: (i) access data, and (ii) to filter the accessed data by implementing one or more business rules;

(c) receiving a transactional request from the client data processing system;

(d) translating the request for use at the transactional data processing system by using one or more application program interfaces (APIs);

(e) executing the translated request to generate request results;

(f) executing one or more application program interfaces (APIs) to translate the request results for subsequent use at the client data processing system; and (g) transferring the translated request results to the client data processing system;

wherein steps (d) and (f) are performed using a dynamically-linked library (DLL) and SQL (structured query language) to manage communication between the transactional data processing system and the client data processing system and wherein the DLL is provided in the form of a specifically configured driver for managing communication between the transactional data processing system and the client data processing system.

9. The method of claim 8 wherein the specifically configured driver manages communication between the transactional data processing system and the client data processing system by receiving a remote procedure call from the client data processing system and the remote procedure call specifies (a) a name or identity of a remote procedure to be invoked by the transactional data processing system; and (b) one or more parameters specifying data to be accessed by the CICS program.

10. The method of claim 9 further including the step of the tansactional data processing system processing the remote procedure call by transferring the remote procedure call with an external call interface (ECI) using a communications area (COMMAREA) as a transfer vehicle.

11. The method of claim 10 wherein, in response to the receipt of the remote procedure call, the transactional data processing system executes the CICS program, utilizing the one or more parameters to filter accessed data by applying one or more business rules to the accessed data.

12. The method of claim 11 further including the step of the CICS program accessing data specified by the one or more parameters by invoking one or more API calls.

13. The method of claim 12 further including the step of the CICS program using the one or more parameters and the accessed data to generate an outbound array comprising one or more columns and one or more rows, wherein the outbound array comprises filtered accessed data, and wherein the outbound array represents selected data from the transactional data processing system as requested by the client data processing system.

14. The method of claim 13 further including the steps of: (a) detecting any selected data that exceed COMMAREA memory, wherein such selected data which exceed COMMAREA memory are referred to as overflow results, (b) storing the overflow results at a datbase address in the computer-readable data storage medium, and (c) providing a marker in the COMMAREA memory for the database address.

15. The method of claim 13 further including the steps of the transactional data processing system sending the outbound array to the client data processing system, and the client data processing system receiving the outbound may from the transactional data processing system.

16. A client data processing system for utilizing a CICS program stored on a transactional data processing system, the client data processing system including:

(a) a computer-readable data storage medium on which is stored an invocation program adapted to invoke a stored CICS program through ODBC (open database connectivity);

(b) a processing mechanism for executing the invocation program so as to invoke the stored CICS program at the transactional data processing system such that the CICS program: (i) accesses data, and (ii) filters the accessed data by implementing one or more business rules; and (c) a communications link establishment mechanism for establishing a communications link between the client data processing system and the transactional data processing system;

wherein the processing mechanism is adapted to receive a transactional request, and to translate the request for use at the transactional data processing system by using one or more application program interfaces (APIs);

wherein the communications link establishment mechanism is adapted to transfer the request to the transactional data processing system;

the client data processing system further including a receiver for receiving a request result from the transactional data processing system, wherein the processing mechanism is adapted to execute one or more transactional data processing system application program interfaces (APIs) to translate the received request result for subsequent use at the client data processing system, and wherein the one or more APIs are implemented using SQL (structured query language) commands;

the client data processing system further including a receiving mechanism for receiving a transactional request;

wherein the processing mechanism further includes a translation mechanism for translating the request for subsequent use at the transactional data processing system, the translation mechanism using one or more transactional data processing system application program interfaces (APIs);

the client data processing system further including a data transmission mechanism for transferring the request to the transactional data processing system, and wherein the receiving mechanism is further adapted to receive a request result from the transactional data processing system;

wherein the computer-readable data storage medium is equipped with a dynamically-linked library (DLL) for use by the processing mechanism to manage communication between the transactional data processing system and the client data processing system and wherein the DLL is provided in the form of a specifically configured driver for managing communication between the transactional data processing system and the client data processing system.

17. The client data processing system of claim 16 wherein the specifically configured driver manages communication between the transactional data processing system and the client data processing system by sending a remote procedure call to the transactional data processing system, and wherein the remote procedure call specifies (a) a name or identify of a remote procedure to be invoked by the transactional data processing system; and (b) one or more parameters specifying data to be accessed by the CICS program.

18. The client data processing system of claim 17 for use with a transactional data processing system that includes a receiver receiving the remote procedure call, and wherein, in response to the receipt of the remote procedure call, The transactional data processing system executes the CICS program so as to access data specified by the one or more parameters.

19. The client data processing system of claim 18 wherein the CICS program uses the one or more parameters to generate an outbound array comprising one or more columns and one or more rows, and wherein the array represents selected data from the transactional data processing system as requested by the client data processing system.

20. The client data processing system of claim 19 for use with a transactional data processing system adapted to send the outbound array to client data processing system, and wherein the receiving mechanism is further adapted to receive the outbound array from the transactional data processing system.

21. A transactional data processing system comprising:
(a) a computer-readable data storage medium on which is stored a CICS program;
(b) a communications link establishment mechanism for establishing a communications link to a client data processing system, the client data processing system including a client data processing mechanism for executing an invocation program adapted to invoke a CICS program through ODBC (open database connectivity); and
(c) a transactional data processing mechanism, responsive to the invocation program, for invoking the stored CICS program such that the CICS program: (i) accesses data, and (ii) filters the accessed data by implementing one or more business rules;

wherein the client data processing mechanism is adapted to receive a transactional request, and to translate the request for use at the transactional data processing system by using one or more application program interfaces (APIs) and one or more SQL (structured query language) commands;

wherein the communications link establishment mechanism is adapted to accept transactional requests from the client data processing system, and wherein the communications link establishment mechanism includes: (i) a data receiver for receiving requests from the client data processing system, and (ii) a data transmitter for transmitting request results to the client data processing system;

wherein the transactional data processing mechanism further includes a translation mechanism for translating requests received from the client data processing system for subsequent use at the transactional data processing system, the translation mechanism using one or more transactional data processing system application program interfaces (APIs);

wherein the client data processing system further includes (i) a data transmission mechanism for transferring requests to the transactional data processing system, and (ii) a data receiving mechanism adapted to receive request results from the transactional data processing system;

wherein the computer-readable data storage medium is equipped with a dynamically-linked library (DLL) for use by the transactional data processing mechanism to manage communication between the transactional data processing system and the client data processing system, and wherein the DLL is provided in the form of a specifically configured driver for managing communication between the transactional data processing system and the client data processing system.

22. The transactional data processing system of claim 21 wherein the specifically configured driver manages communication between the transactional data processing system and the client data processing system by receiving and processing a remote procedure call from the client data processing system, and wherein the remote procedure call specifies (a) a name or identity of a remote procedure to be invoked by the transactional data processing system; and (b) one or more parameters specifying data to be accessed by the CICS program.

23. The transactional data processing system of claim 22 wherein, in response to receipt of a remote procedure call, the transactional data processing system executes the CICS program so as to access the data specified by the one or more parameters.

24. The transactional data processing system of claim 23 wherein the CICS program uses the retrieved data and the one or more parameters to generate an outbound array comprising one or more columns and one or more rows, and wherein the array represents selected data from the transactional data processing system as requested by the client data processing system.

25. The transactional data processing system of claim 24 wherein the transactional data processing system data transmitter is adapted to send the outbound array to the client data processing system, and wherein the client data processing system includes a receiving mechanism for receiving the outbound array from the transactional data processing system.

26. The transactional data processing system of claim 22 wherein the remote procedure call is processed by transferring the remote procedure call with an external call interface (ECI) using a communications area (COMMAREA) as a transfer vehicle.

27. The transactional data processing system of claim 26 further including an overflow processing mechanism for detecting request results that exceed COMMAREA memory, storing the overflow results at a database address in the computer-readable data storage medium, and providing a marker in the COMMAREA for the database address.

* * * * *